(12) United States Patent
Dudarev et al.

(10) Patent No.: US 11,259,536 B2
(45) Date of Patent: Mar. 1, 2022

(54) DAIRY SALT, METHODS FOR ITS PRODUCTION AND FOOD PRODUCTS CONTAINING IT

(71) Applicant: Wimm-Bill-Dann OJSC, Moscow (RU)

(72) Inventors: Grigoriy A. Dudarev, Altay Region (RU); Stephen Gravina, Rutherford, NJ (US); Sivaraj Kaliappan, Schaumburg, IL (US); Sergey N. Knyazev, Moscow Region (RU); Yuliya Kurash, Sleepy Hollow, NY (US); Maksim N. Omarov, Moscow Region (RU); Sergey I. Perminov, Moscow Region (RU); Vitaliy S. Somov, Kaluga Region (RU); James William Stalder, Dallas, TX (US)

(73) Assignee: Wimm-Bill-Dann OJSC, Moscow (RU)

( * ) Notice: Subject to any disclaimer, the term of this patent is extended or adjusted under 35 U.S.C. 154(b) by 0 days.

(21) Appl. No.: 16/923,281

(22) Filed: Jul. 8, 2020

(65) Prior Publication Data
US 2020/0337325 A1 Oct. 29, 2020

Related U.S. Application Data

(62) Division of application No. 15/106,697, filed as application No. PCT/US2014/067948 on Dec. 1, 2014, now abandoned.

(51) Int. Cl.
A23C 9/142 (2006.01)
A23L 27/00 (2016.01)
(Continued)

(52) U.S. Cl.
CPC ............ *A23C 9/1425* (2013.01); *A23C 9/144* (2013.01); *A23C 9/1427* (2013.01); *A23L 27/40* (2016.08); *A23L 27/84* (2016.08); *A23V 2002/00* (2013.01)

(58) Field of Classification Search
CPC ..... A23C 9/1425; A23C 9/1427; A23C 9/144; A23L 27/40; A23L 27/84
See application file for complete search history.

(56) References Cited

U.S. PATENT DOCUMENTS

| 3,787,216 A | 1/1974 | Wingerd |
| 3,860,732 A * | 1/1975 | Eisenstadt ............... A23L 27/45 426/649 |

(Continued)

FOREIGN PATENT DOCUMENTS

| EP | 0291980 | 11/1988 |
| JP | 2265456 | 10/1990 |

(Continued)

OTHER PUBLICATIONS

"Ultrafiltration, Nanofiltration and Reverse Osmosis" Jan. 23, 2017 https://www.safewater.org/fact-sheets-1/2017/1/23/ultrafiltration-nanoandro (Year: 2017).*

(Continued)

*Primary Examiner* — Katherine D Leblanc
(74) *Attorney, Agent, or Firm* — Barnes & Thornburg LLP; G. Peter Nichols (57) ABSTRACT

Processing of milk raw material produces a dairy salt. Preliminary treatment of the milk raw is carried out, with pasteurization and its concentration by nanofiltration through a filter with a pore size of 0.001-0.01 µm, subsequent filtration of the obtained nanofiltration permeate through a membrane module with a pore size of 0.0001-0.001 µm of a reverse osmosis unit, electrodialysis of the obtained RO retentate, concentration of the concentrate or its (Continued)

concentration and drying. The dairy salts may be manufactured and used to salt food products, beverages, granulated cottage cheese, potato chips, crackers, and dips. A masking fraction with organic acid, amino acid, fatty acid, and sugar portions successfully hides the off-notes otherwise associated with potassium compositions. Food products salted with any of the dairy salts described herein achieve reduced sodium content without compromising flavor.

2 Claims, 2 Drawing Sheets

(51) Int. Cl.
*A23L 27/40* (2016.01)
*A23C 9/144* (2006.01)

(56) References Cited

U.S. PATENT DOCUMENTS

| | | | |
|---|---|---|---|
| 4,216,244 | A | 8/1980 | Allen, Jr. |
| 4,963,387 | A | 10/1990 | Takahiro et al. |
| 5,679,390 | A | 10/1997 | Conover |
| 5,853,792 | A | 12/1998 | Zolotov |
| 6,399,140 | B1 | 6/2002 | Marjaana et al. |
| 2003/0032600 | A1 | 2/2003 | Ulrich |
| 2004/0033573 | A1 | 2/2004 | Norddahl |
| 2004/0101612 | A1 | 5/2004 | Mistry |
| 2007/0166447 | A1 | 7/2007 | Ur-Rehman et al. |
| 2007/0292592 | A1 | 12/2007 | Zasypkin et al. |
| 2008/0226790 | A1 | 9/2008 | Johnson |
| 2009/0041900 | A1* | 2/2009 | Zuniga .............. C01D 5/00 426/72 |
| 2011/0262618 | A1 | 10/2011 | Melwitz |

FOREIGN PATENT DOCUMENTS

| | | |
|---|---|---|
| WO | 99/40798 | 8/1999 |
| WO | WO 2006023812 | 3/2006 |

OTHER PUBLICATIONS

U.S. Appl. No. 15/106,697, filed Jun. 20, 2016, Pending.
Holub, Ines, et al., "Novel findings on the metabolic effects of the low glycaemic carbohydrate isomaltulose (Palatinose™)," British J. of Nutrition (2010), 103, 1730-1737, doi:10.1017/S0007114509993874 (las accessed Dec. 11, 2019) (8 pages).
Royal Society of Chemistry, "Carbohydrates," Chemistry for Biologist, available at http://www.rsc.org/Education/Teachers/Resources/cfb/carbohydrates.htm (last accessed Dec. 11, 2019) (7 pages).
Deutsches Zentrum fuer Diabetesforschung DZD, "All sugars are not alike: Isomaltulose better than table sugar for type 2 diabetes patients." ScienceDaily. ScienceDaily, Feb. 16, 2016 www.sciencedaily.com/releases/2016/02/160216111400.htm (3 pages).
PCT Search Report and Written Opinion for PCT/US2014/067948 dated Mar. 6, 2015 (19 pages).
Office Action dated Oct. 28, 2020 in Chinese Application No. 201480070766.5.
Office Action dated Jul. 20, 2021 in Mexican Application No. MX/a/2016/008365.
Office Action dated Feb. 20, 2021 in Chinese Application No. 201480070766.5.

* cited by examiner

DAIRY SALT, METHODS FOR ITS PRODUCTION AND FOOD PRODUCTS CONTAINING IT

This application is a divisional application of U.S. patent application Ser. No. 15/106,697 filed Jun. 20, 2016, which is a US 371 National Stage application from PCT/US2014/067948 filed Dec. 1, 2014, which claims priority to Russia Application RU2013157311 filed Dec. 24, 2013; each of the are incorporated herein by reference.

The invention pertains to the food and beverage industry. It can be used in the production of any number of food or beverage products, including dairy products (various types of cheese, including fresh (of the Queso Fresco type) and cottage cheese), products of the confectionery and baking industries, chips, products in whose production addition of salt is prescribed (cooked sausage, smoked sausage, smoked cheese, ham, cold cuts, meat products, etc.), soups, dips, and sauces.

BACKGROUND

An extensive review of the scientific and technical literature, patent documents and also the modern food product market indicated the growing importance of the problem of using salt in human nutrition. Table salt has historically been used in the production of food products as a taste additive and natural preservative. Salty is one of the five basic tastes, together with sweet, sour, bitter and umami. Several types of salt are known, depending on their origin, type of processing and degree of grinding of the mineral having the chemical formula NaCl.

At the same time, in view of the need to control the amount of table salt in the daily diet, alternatives for its partial replacement are being actively developed and introduced. The following are known among them: sodium chloride substitutes (salts of other elements, including chlorides), yeast extracts, hydrolyzed vegetable proteins (HVP), flavorings, components based on peptides, spices.

One of the most rational and successful solutions in creating alternatives for partial replacement of table salt in food products is complex processing of secondary food raw material in order to isolate the necessary substitute components. Scientists from Europe, the US, Canada, Japan have found that byproducts of processing of milk raw material can be a rich source for isolating balanced mineral-organic mixtures similar in taste perception to table salt.

The salt sodium chloride (NaCl) is an important element that ensures human and animal vitality. The most important mechanism of active transport in animal cells is the so-called sodium-potassium pump, connected with a difference in the concentration gradient of $K^+$ and $Na^+$ ions outside and inside the cell.

Sodium as part of salt is one of the essential elements for accomplishing vitally important functions of the human body. About 50% of all the sodium in our body is found in the extracellular fluid, 40% in bones and cartilage, about 10% in cells. Sodium forms part of bile, blood, cerebrospinal fluid, pancreatic juice, mother's milk. It is also necessary for normal function of nerve endings, transmission of nerve impulses and muscular activity, including the heart muscle, and also for assimilation of certain nutrients by the small intestine and kidneys.

Chlorine in turn participates in the formation of special substances that promote splitting of fats. Necessary for the formation of hydrochloric acid (the main component of gastric juice), it takes care of eliminating urea from the body, stimulates function of the reproductive and central nervous systems, promotes formation and growth of bone tissue. Human muscle tissue contains 0.20-0.52% chlorine, bone tissue—0.09%; most of this trace element is contained in blood and extracellular fluid.

Sodium ions ($Na^+$), potassium ions ($K^+$) and chloride ions ($Cl^-$) predominate in extracellular and intracellular fluids. More than a third of the ATP consumed by an animal cell in a state of rest is consumed to pump sodium and potassium.

The significance of the sodium-potassium pump for the life of each cell and the body as a whole is determined by the fact that continuous pumping out of sodium from the cell and injection of potassium into it are necessary for many vitally important processes: osmoregulation in retention of cell volume, maintaining a potential difference on both sides of the membrane, support of electrical activity in nerve and muscle cells, for active transport to membranes of other substances (sugars, amino acids). Large amounts of potassium are also required: protein synthesis, glycolysis, photosynthesis and other processes.

Modern medical science recognizes that an excessive amount of consumed sodium complicates kidney function, in which case sodium accumulates in the human body and also promotes retention of excess amounts of water in it. An increase in liquid volume in the body is accompanied by negative changes in the circulatory system: blood pressure changes and dysfunction of the heart muscle is possible.

Both an excess and shortage of sodium chloride in the body of a mammal leads to disruption of the vitality of the organism. Milk, which is a natural product of the mammal body, has the most optimal ratio of sodium, potassium and chlorine concentrations in its composition, for which reason dairy salt obtained during processing of milk represents the most optimal alternative to table salt.

Research of Russian scientists substantiated the use of integrated processing of whey (Khramtsov, A. G., Evaluation of secondary milk raw material and products produced from it, Procedural instructions, St Petersburg: GIORD, 2003, 232 pages). These processes are necessary for purification of the raw material, modification of its composition, ensuring microbiological purity and reducing growth and acidity on further processing.

Preliminary processing of milk raw material is conducted to reduce the risk of spoiling of the raw material and an increase effectiveness of subsequent baromembrane processes and includes purification on separators-purifiers, purification on vibrating screens, thermization or pasteurization.

Membrane technologies are widely used for fullest processing of milk raw material in industry. The main processes based on baromembrane technology are known:

Ultrafiltration (UF) is a membrane separation process conducted at a pressure of 0.2 to 5 bar with membrane elements with a pore diameter from 10 to 100 nm. Ultrafiltration in the dairy industry is used for standardization and normalization of milk according to fat-protein ratio (in preparing concentrates for cheese production), concentration of the protein-carbohydrate/protein fraction of milk/whey (in the production of various concentrates).

Nanofiltration (NF) is a membrane separation process conducted at a pressure of 1 to 20 bar with membrane elements with a pore diameter from 1 to 10 nm. It is used for concentration of milk raw material, partial demineralization. During NF treatment concentration of macromolecules (protein, fat) and also lactose occurs, whereas mineral salts and partly lactose enter the permeate.

Reverse osmosis (RO) is a membrane separation process conducted at a pressure of 10 to 40 bar with membrane elements with a pore diameter from 0.01 to 1 nm. As a result of reverse osmotic treatment of raw material concentration of almost all the components occurs with parallel separation of the solvent. RO is used in the dairy industry in the production of various concentrates, including whey concentrates.

Electrodialysis is a membrane process occurring under the influence of an electric field. The principle of the electrodialysis process consists of selective passage of individual charged ions through ion exchange membranes under the influence of an external current force. The membranes have selectivity and do not allow ions to pass through in the opposite direction. The process is used in industry for partial or complete demineralization of raw material.

Use of whey salts as a component for salting of food products is known (RU 94010413 A23B4/00 Apr. 20, 1996). For production of this product a group of processes is performed directed toward dehydration and/or bonding of moisture in products from meat or fish. Whey is used as part of the salt composition in order to enrich the product with biogenic substances of milk (mineral salts, carbohydrates, etc.): meat or fish raw material is subjected to salting with table salt and then steeping in a whey solution occurs (for example 1 L per 1 kg of fish/meat) in order to enrich it and subject it to maturation. Salting of a food product by steeping causes significant consumption of whey per unit product. There is no possibility for regeneration of whey after steeping processes and, as a result, the need for its utilization arises with contamination of effluents with mineral substances and organic residues. This invention is only applicable for meat and fish raw material.

A method is also known for producing a salt solution from milk raw material and whey salt prepared by the given method (RU 2308196 A23C9/142 Jun. 27, 2005). Whey salt is obtained from the permeate obtained from ultrafiltration of milk. The UF permeate is concentrated by nanofiltration followed by filtration on a reverse osmosis unit. The obtained RO retentate containing dry substance from 1 to 3% is also a solution of dairy salts.

This invention represents an integrated approach to processing all the constituents of milk and modification of the composition of the finished product with allowance for the requirements of persons suffering from lactose intolerance, but does not deal with the question of producing salts from whey. The dairy salts obtained according to this method are not the main desired component, but serve merely as a secondary component in the preparation in the preparation of drinkable milk. The salt solution has low concentration, which makes its transport complicated and economically unjustified. Ultrafiltration of whole milk can also lead to losses of fat owing to concentration polarization phenomena on the membrane module and also destabilization phenomena and aggregation of fat globules during mechanical effects.

A composition for salting of meat products and a method for its preparation from whey are known (RU 2468586 A23B4/02 Jul. 28, 2010). The composition includes whey mineralizate, table salt and sodium nitrite in proportions of 5000:1250:2.36. Its use during salting by introducing a complex of whey salts leads to a reduction in content of sodium salts and enrichment of the product with components useful to the human body contained in milk. The whey mineralizate is obtained from whey which is subject to electrodialysis treatment, the obtained concentrate is sent to concentration and/or drying, producing a product either in liquid form with a content of dry substance of 3-50% or in dry form with a content of dry substance of 95-98%. Use of whey that has not undergone preliminary treatment, pasteurization, concentration by nanofiltration significantly increases the electrodialysis time and the consumption of electrical power, and also leaves a large amount of production wastes requiring special utilization. Addition to the composition for salting of table salts and sodium nitride increases the cost of the product and disturbs the salt balance of the end product.

A dairy salt concentrate and method for its production are known (http://www.dairysalt.com/en/the-dairysalt-range/replacing-salt-with-dairysalt, http://www.accessdata.fda.gov/scripts/fcn/gras_notices/GRN376.pdf). This concentrate can be used as a substitute or additive to table salt in the preparation of different food products in order to reduce total consumption of sodium chloride in the diet while retaining taste properties. The dairy salt concentrate is obtained from UF permeate (from ultrafiltration of acid whey of defatted milk after acid precipitation of casein). The obtained UF permeate is subjected to filtration on a reverse osmosis installation. KOH is added to the obtained RO permeate, centrifuged and concentrated on a vacuum evaporator with subsequent drying.

The finished concentrate of milk minerals has the following composition: mineral salts 78-88% (including sodium 8-10%, potassium 28-30%, chlorides 40-45%, calcium 2.5-3%), lactose 5-9%, protein 1%, fat—less than 0.5%, free moisture—2 to 5%.

The claimed method of production does not involve the use of whey obtained in industrial processes of cottage cheese and cheese production. This technology does not permit a lactose content to be achieved in the product of more than 15%, whereas according to a number of proposals it is precisely the lactose content in the dry concentrate of dairy salts that promotes a reduction of total bitterness in organoleptic perception.

After reverse osmosis treatment of the UF permeate of the whey, not the RO retentate but the RO permeate is used with very low content of dry substance. Enormous energy resources are consumed to concentrate and isolate the dry substance from this medium. To obtain the final composition potassium hydroxide introduced from the outside is used, which also increases the cost of the product.

A lactose salt is known which is concentrate of whey salts (http://www.accessdata.fda.gov/scripts/fcn/gras_notices/grn000052.pdf), which in dry form is used as a source of milk calcium in food additives, in different enriched products and beverages. To produce this salt the whey obtained by acid precipitation from milk raw material is subjected to pasteurization, undergoes concentration and filtration on a baromembrane installation, followed by concentration and drying. The dry concentrate contains 79% minerals, including phosphorus (in the form of phosphate)—41% and calcium—24%, organic compounds in the form of citrates—9%, protein—5%, lactose—9%, fat—less than 0.5%. Special significance in this product is assigned to calcium and phosphorus, which are an important element for functioning and development of bone tissue. Because of its characteristic composition the product cannot be used for full replacement of table salt for cooking purposes or in the production of food products. Moreover, only acid whey from casein production can be a raw material for it.

A method is known for production of a concentrate of mineral salts from milk (U.S. Pat. No. 5,185,166 Feb. 9, 1993, Nakagawa et al.). The raw material for its production is whey. The method for production of the concentrate of lactose salts includes concentration of whey by ultrafiltration on membrane elements with a cutoff threshold relative to molecular weight of 40,000 Daltons (which corresponds to a pore diameter of the membrane of 0.01-0.05 µm) to a lactose content of 50%, elimination of lactose by centrifuging and in the case of production of concentrate in dry form, drying of the obtained salt solution. The finished dry concentrate has the following composition: lactose 38-60%, protein 1 to 3%, mineral substance 20-35% (including potassium 2-10%, calcium 2-5%, sodium 2.5-5%, magnesium 0.2-0.5%, phosphorus 0.1-5% and also trace amounts of iron, zinc, manganese and copper). This concentrate can be used as an additive for different beverages, including juices owing to its transparency and high biological value of the mineral composition. But at the same time its use as a taste additive or substitute for table salt is limited as a result of the low content of potassium and chlorides. Performance of whey concentration when performed by the membrane method is irrational to achieve more than 58% dry substance, since it requires an extensive time and leads to massive "contamination" of the membrane elements with particles of organic compounds (for example, large protein or fat molecules), and the process of settling of the concentrate for crystallization of lactose from it is also a lengthy processing operation. In the case of a slight increase in temperature during this process a rapid rise in acidity and a potential risk of microbiological contamination are possible.

The task of isolating lactose from salt concentrate of whey can be solved more economically from the standpoint of time and the resources by using additional membrane processes.

The closest analog to the claimed invention is dry whey salt and a method for its preparation (WO 99/40798 A23C 21/00, A23L 1/237, 1/304, August 1999). This object contains natural minerals of whey and can be used as a partial substitute for table salt. Cheese, cottage cheese or casein whey and also permeate from milk or whey can be used as raw material. The method for production of dry whey salt includes concentration of the raw material by nanofiltration on membranes with a cutoff threshold of 150-300 daltons (which corresponds to a pore diameter of the membrane of 0.001-0.0001 µm) at a temperature of 20° C. and a pressure of 22 bar, filtration of the NF permeate on a reverse osmosis installation and drying, or concentration after reverse osmosis treatment and drying.

The finished dry salt produced according to this method contains potassium (19-27%), calcium (0.5-2%), sodium (5-7%), magnesium (0.1-1%), chlorides (17-37%), phosphorus (0.5-3%), protein (10-20%), lactose (10-35%). This salt does not have a bitter taste, which distinguishes it from artificially produced compositions from individual mineral components in similar ratios and can be used as a substitute for ordinary table salts for salting of food and food products. The possibility of using only concentration for treatment of the NF permeate offered by this method is difficult and poorly effective as a result of the low content of dry substance in this raw material. The load on the vacuum evaporator is significantly increased and the energy costs are increased.

The pressure value higher than 20 bar during nanofiltration could also promote rapid wear of the membrane element and impose additional strength requirements on the material and type of design of the membrane. An increase in working pressure in the membrane installation also causes an increase in load on the pumps and, as a result, increases the energy costs of production. Salt with a lactose content no lower than 10% is obtained according to this method, whereas in the production of a number of products it is necessary to use a salt with reduced lactose content (less than 10%). The low lactose level can be caused not only by the processing characteristic of the products, but also the need for absence of a "milk" taste, the carrier of which is mostly lactose.

DESCRIPTION

The tasks of the claimed inventions are to develop an effective ecologically safe method for processing whey and to produce from it a complex lactose salt of variable composition having increased organoleptic quality and ensuring a balanced ratio of sodium, potassium, calcium salts when used in food products, which is necessary for complete assimilation of the food product by a living organism.

The following technical results are achieved in solving these tasks:

reduction of ecological load on the environment (reduction of environmental contamination) by more complete processing of the milk raw material;

an increase in profitability of milk processing by additional extraction of useful components from whey;

ensuring a high degree of transfer of biologically valuable milk components from the initial raw material to the end product with high organoleptic indices suitable for wide use in the food industry, by selective separation of components of the raw material by optimal selection of a sequence of different membrane processes and production conditions, ensuring productivity of the operations and high retention of the most important nutrients;

increase in quality of the food products by reducing the content of table salt in them and replacing it with dairy salt, having a well-balanced ratio of components for mammals;

increase in dietary value of products in whose production salting with complex dairy salt is prescribed, by an optimal ratio of sodium and potassium chlorides in the salt and high lactose content;

optimal use of energy costs for maximum extraction of impurities in the salts from the milk raw material.

These technical results are achieved in that in the known method the raw material from producing the salt composition can be cottage cheese whey obtained in the production of cottage cheese by the conventional or separator method, whey from production of granulated cottage cheese, permeate following production of cottage cheese by the ultrafiltration method, cheese whey, permeate, obtained during ultrafiltration of milk in the production of fresh cheese. This raw material is a byproduct in the production of such products as cottage cheese, cheese, casein, and various preconcentrates. Mineral salts of lactose are found as a true solution, which makes their isolation possible and economically justified by means of membrane methods according to the claimed scheme.

The salt blend composition includes potassium, magnesium, calcium, chloride and sulfate ions, lactic acid and its salts, non-protein nitrogenous substances, lactose. All these components are of natural origin, i.e., are contained in native form in the initial milk raw material.

The balanced content of potassium, chloride, sodium ions in the complex salt obtained according to the claimed method ensures satisfaction of the needs of the body for minerals.

Figure 1:
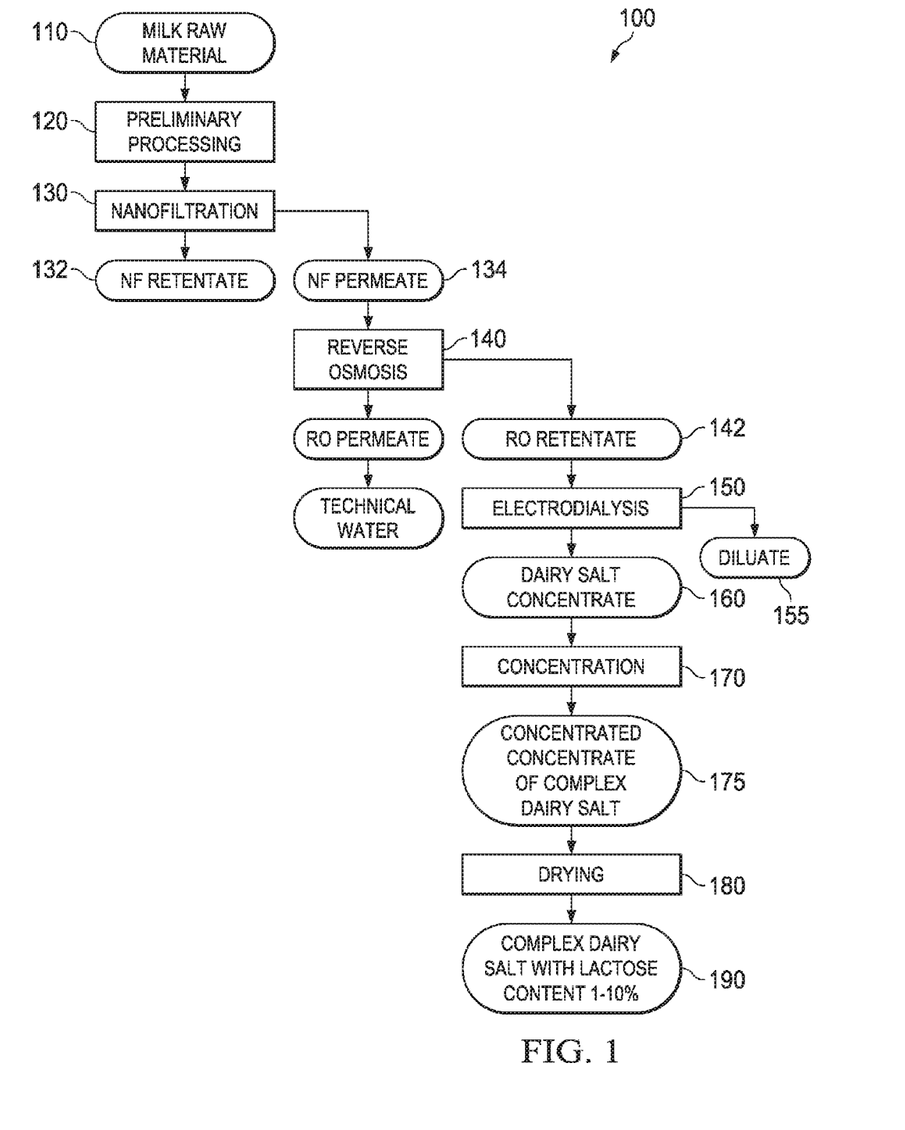
FIG. 1. Diagram of preparation of complex dairy salt with a lactose content of 1-10%.
Figure 2:
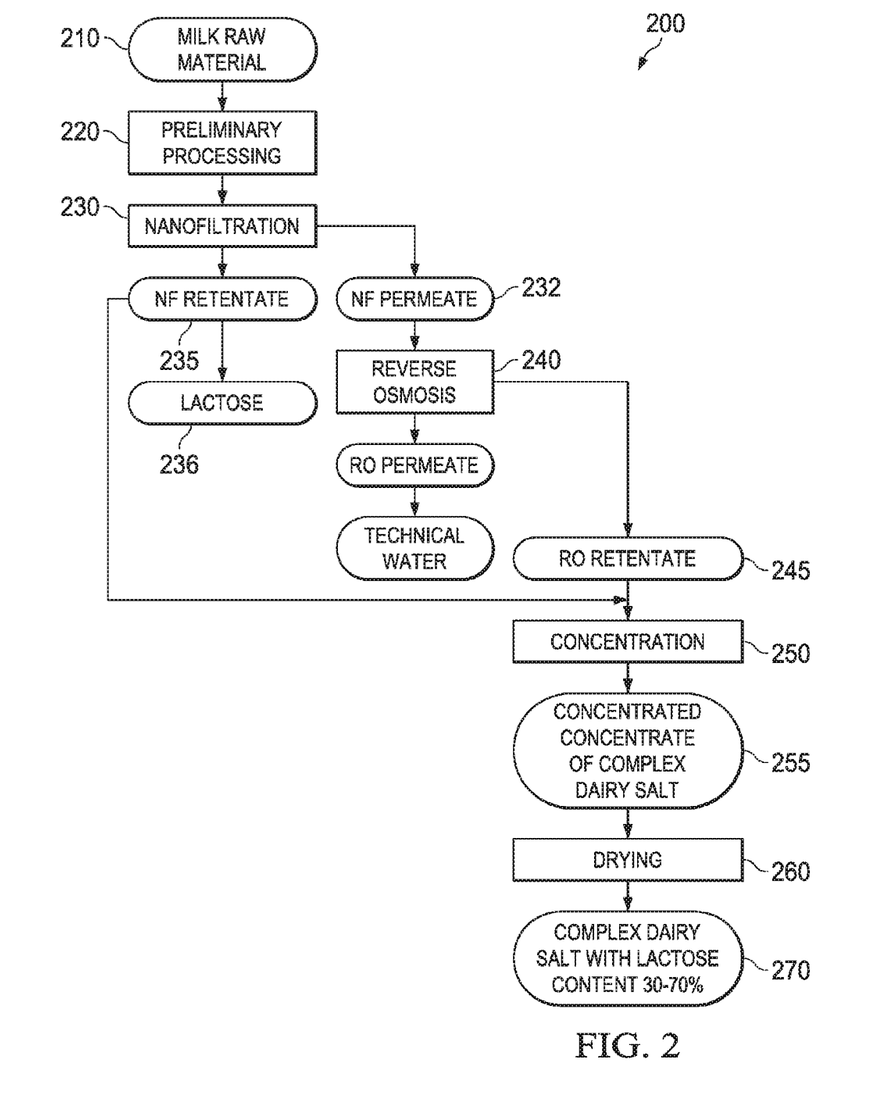
FIG. 2. Diagram of preparation of complex dairy salt with a lactose content of 30-70%.

As depicted in the FIGS. 1-2, the aforementioned technical results are also achieved in that whey or milk raw material 110, 210 in the method 100, 200 for production of the complex lactose salt 190, 270 is initially subjected to preliminary treatment 120, 220 in pasteurization for purification and preparation for further processing, whereupon nanofiltration 130, 230, reverse osmosis (RO) 140, 240 and electrodialysis treatment 150 are conducted in succession (FIG. 1) or mixing of the RO retentate 245 and NF retentate 235 without performing electrodialysis (FIG. 2), producing a dairy salt concentrate 190, 270 for subsequent concentration 170 or concentration 250 and drying 260.

This production scheme not only ensures a high degree of transfer of biologically valuable milk components from the initial raw material to the end product, but permits a unique composition to be obtained in the high organoleptic indices suitable for widespread use in the food industry. This is explained by the selectivity of separation of the components of the raw material in various membrane processes and the production conditions that ensure productivity of the operations and high retention of the most important nutrients.

The average composition of the whey of different types and permeate is shown in Table 1.

TABLE 1

Component composition of whey and protein.

| Component | Cottage cheese whey (produced by the separator method) | Permeate (produced by the ultrafiltration method) | Cheese whey |
|---|---|---|---|
| Dry substance | 5.0-6.5 | 4.1-5.5 | 5.0-6.8 |
| Protein | 0.5-1.2 | 0.3-0.8 | 0.4-1.0 |
| Lactose | 3.8-5.0 | 3.5-4.7 | 4.0-4.9 |
| Fat | 0.05-0.4 | 0.05-0.2 | 0.05-0.5 |
| Non-protein nitrogen | 0.1-03 | 0.1-0.2 | 0.1-0.4 |
| Ash | 0.5-1.0 | 0.6-1.0 | 0.5-1.0 |

Mineral salts in the dry substance of the raw material occupy from 10 to 20%.

To accomplish this invention, in addition to traditional methods of processing, baromembrane methods of processing milk raw material are used: ultrafiltration, nanofiltration, reverse osmosis, electrodialysis.

The advantages of this group of methods are minimal effect on the components of the raw material during processing, low energy costs in comparison with traditional methods of concentration of milk raw material, as well as the possibility of controlled regulation of the composition of the future products. These characteristics of the methods permit isolation from the raw material of a composition of minerals and organic substances with high degree of retention, at the same time as deliberately modulating their proportional contents.

To ensure microbiological purity of the raw material during intermediate storage and lengthy membrane processing, it is necessary to carry out intermediate preparation of the raw material. For this purpose the raw material is initially purified on filters and then sent to a vibrating screen to eliminate large parts of the casein dust, which prevent effective baromembrane treatment. They are then pasteurized under the following conditions:

T=67±2° C., τ=15-30 min or
T=72±2° C., τ=15 sec

These treatment conditions stem from the need to retain the protein fraction of the whey in a stable state, mostly consisting of thermolabile whey proteins.

After pasteurization, the milk raw material is cooled to the intermediate storage temperature or, in the case of a continuous processing method, to the temperature of the membrane process of 20-50° C.

For the case of production of complex dairy salt with the following composition: mineral salts 70-80%, protein 10-20%, organic acids 6-9%, lactose 0.5-10%, water—remainder, the process is accomplished according to the scheme shown in FIG. 1.

In the case of production of a complex dairy salt with the following composition: mineral salts 18-40%, protein 4-6%, organic acids 2-3%, lactose 30-70%, water—remainder, the process is accomplished according to the scheme shown in FIG. 2.

Membrane treatment of the raw material is carried out on installations of different types, mostly roller installations user polymer membranes.

The nanofiltration and reverse osmosis processes can be conducted on a single installation which includes different membrane modules of centrifugal pumps connected in sequence. Various types of polymer membranes can be used for nanofiltration. The type of membrane comes from the manufacturer of the equipment, the most widespread installations are from the DSS, Alpma and other companies. The size of the pores is chosen from 0.01 to 0.001 µm. For reverse osmosis, polymer membranes are used (for example from the KOCH Co.) with a cutoff threshold of about 400 daltons, which corresponds to a pore diameter of 0.0001-0.001 µm (1-10 nm). The process pressure is established in the range 30-40 bar.

The nanofiltration process is run at a temperature from 20 to 40° C. and a pressure of 5 to 20 bar, which stems from the need to ensure optimal rheological characteristics of the raw material and also the need to prevent an increase in acidity of the raw material at an elevated temperature.

During the nanofiltration process 130, 230 the initial milk raw material 110, 210 is separated into a retentate 132, 235, mostly containing lactose, protein, an insignificant amount of mineral substances, and a permeate 134, 232, mostly containing lactose and mineral substances. Use of nanofiltration in the first step of the baromembrane treatment permits separation of the mineral part for further filtration.

For concentration of the salt solution a reverse osmosis process 140, 240 is used.

Preliminary concentration is economically justified and rational, since it permits a reduction in time and energy costs, which can develop during processing on a vacuum evaporator owing to elimination of additional moisture.

The NF permeate 134, 232 obtained as a result of the process with a content of dry substances of 0.4-0.7% is sent to reverse osmosis 140, 240, whose membrane module has a pore diameter of 0.0001-0.001 µm. Filtration process is run at a pressure of 10-40 bar and a temperature of 10-15° C. The high applied pressure in the process is explained by the need to overcome the osmotic pressure of the solvent (in this case water), to ensure passage of solvent molecules through the semipermeable membrane. These temperature conditions ensure retention of the acidity values of the raw material and prevent development of undesirable microflora in it.

With reference to FIG. 1, to obtain reduced lactose content in the finished lactose salt 190, the obtained RO retentate 142 can also be subjected to electrodialysis 150 treatment. Electrodialysis 150 is run in order to free the RO retentate 142 of lactose. The process is run at temperatures of 15-25° C., which ensures optimal rheological characteristics of the solutions while retaining conditions that prevent a rapid increase in acidity. As a result of the effect of a group of the complex of electromotive force, excess pressure and semipermeable membrane, separation of the incoming stream occurs to a salt concentrate 160 and a partially/fully desalted diluate 155. The process is run on an electrodialysis unit (for example, Mega). It is most preferable to perform this at a temperature of 10-20° C., current intensity 1.0-1.2 A, voltage 45-55 V; the flow rate of the streams of diluate, concentrate and electrolyte are established at 600-800 L/h, 600-800 L/h, 400-600 L/h respectively. A solution of lactose remains in the diluate with insignificant impurities of protein and salts of monovalent ions. The concentrate after electrodialysis, in which dairy salts amount to as much as 80%, is sent for further concentration 170 and/or drying 180. With reference to FIG. 2, in the case of preparation of salt with increased lactose content 270 the retentate 245 obtained after reverse osmosis filtration 240 is mixed with the nanofiltration retentate 235 in proportions of 1:25, 1:20, 1:15, etc. in a stream or through a vessel before the surge tank of the vacuum evaporator. The NF retentate 235 is mostly a source of lactose 236 and whey protein. The high content of these components in the salt is technologically preferred in the case of production of different types of products, for example, crackers or chips, in which flavorings are introduced. Lactose, whey protein and lipids are a base for application of aromatic substances and their distribution along the surface of the end product.

It is only justified to concentrate the salt solution by membrane methods to a content of substances in the concentrate of no more than 20% in view of the duration of this process and gradual contamination of the membrane elements and, as a result, a reduction in process efficiency.

To concentrate the salt solution, a vacuum evaporation process is used. The concentrate obtained as a result of reverse osmosis treatment (with electrodialysis or without it) is sent to concentration in a vacuum evaporator.

The secondary steam of each housing (except for the last) in the multihousing evaporator unit is used to heat the next housing. The vacuum in the evaporators is created as a result of condensation of secondary stem in water cooled condensers. Use of multihousing vacuum evaporators is most effective from the standpoint of steam economy; use of partial vacuum during concentration permits the use of lower temperatures in comparison with evaporation at atmospheric pressure and avoids the critical effect of high temperatures on thermolabile components of the raw material. The concentration process is stopped when a weight fraction of dry substance of 35-40% is reached in the concentrate.

Depending on the needs of production and the products in which use of the lactose salt is proposed, the production process is stopped and the obtained concentrate used or sent to a dryer, for example, of the spray type. The process is completed when a weight fraction of water in the end product of 2-5% is reached.

The complex lactose salt in dry form is more convenient for transport and storage and can also be used in processes where salting of the product with a salt solution is unacceptable and use of salt only in dry form is necessary.

Depending on the specific complex of baromembrane processes used in the production scheme, a complex dairy salt of different composition is obtained (see appendix—FIG. 1, FIG. 2).

The production methods 100, including preliminary treatment 120 of the raw material 110, its concentration by nanofiltration 130, filtration of the obtained NF permeate 134 through a membrane module of a reverse osmosis unit 140, electrodialysis 150 of the obtained RO retentate 142, with concentration 170 of the concentrate 160 and its drying 180, permits a dry salt 190 of the following composition to be obtained.

TABLE 2

Average composition of complex dairy salt with reduced lactose content.

| Component | Content, in % |
|---|---|
| Lactose | 1-10 |
| Protein | 12-18 |
| Mineral Salts | 70-80 |
| Organic Acids | 6-9 |

The method for production 200, including preliminary treatment 220 of the milk raw material 210, pasteurization and subsequent concentration by nanofiltration 230, filtration of the obtained NF permeate 232 through a membrane module of a reverse osmosis unit 240, mixing of the obtained RO retentate 245 with the NF retentate 235, with subsequent concentration 250 of the obtained mixture and its drying 260 permit a dry salt 270 with the following composition to be obtained:

TABLE 3

Average composition of complex dairy salt with increased lactose content.

| Component | Content, in % |
|---|---|
| Lactose | 30-70 |
| Protein | 2-8 |
| Mineral Salts | 20-50 |
| Organic Acids | 2-3 |

Production of a broad spectrum of food products is possible using complex dairy salts: dairy products (granulated cottage cheese, cheeses, etc.), chips, confectionary products (crackers), meat products (sausage, hams, etc.).

The product prepared using this component has higher biological value in comparison with a product in which table salt is used. The content of sodium is reduced and the taste perception improved.

Introduction of salt, depending on the process for the specific product is possible by adding a concentrate with 35-40% dry substance (after vacuum evaporation) in a mixing vessel when mixing of all the recipe components occurs, or by the method of sprinkling dry salt powder. It is also possible to produce an intermediate salt solution of the dried complex dairy salt for salting.

Performance of the Invention

The complex dairy salt is produced by several methods, depending on the final content of components in the composition and also the type of use—in dry or liquid form.

Specific examples of methods for production and use of the complex dairy salt are given below.

Example 1

For production a complex lactose salt weighed in an amount of 270 tons with a temperature of 12° C. obtained in the production of cheese is sent by pipeline to preliminary treatment on an AMCKO vibrating sieve with a pore size of 40 μm in order to eliminate large protein particles, whereupon it is heated to a temperature of 40±2° C. in the first section of a pasteurization-cooling unit of the plate type (PPOU-10000) and then subjected at this temperature to centrifugal purification on a separator-purifier for defatting of the whey of the brand MSI 350-01-772 at a drum rotational speed of 6000 rpm in order to eliminate fat.

The whey purified in this way in an amount of 270 tons is sent by pipeline to the second section of the pasteurization-cooling unit of the plate type, where it is pasteurized at a temperature of 68±2° C. with holding for 10 seconds in order to ensure microbiological purity during subsequent treatment. The whey is then cooled to a temperature of 10±2° C. in the cooling section.

The pasteurized cooled whey is then sent by pipeline to the nanofiltration unit (Alpma) with a pore size of 0.001 µm equipped with a membrane filter (KOCH) with a pore size of 0.001. The whey is concentrated at a temperature of 10±2° C., a flow rate of the whey of 500 kg/h. During the nanofiltration process because of the specific selective membrane filter (0.001 µm) separation of whey occurs into an NF retentate in which mostly protein remains and partially lactose, and an NF permeate, into which the lactose, mineral salts, fine protein fractions enter. Concentration occurs to a protein content in the retentate of 1.8%. The concentration factor of the process is 3.5.

The obtained NF retentate in an amount of 78.5 tons is collected in individual tanks and then used in other processes (production of whey protein concentrates).

The NF permeate obtained as a result of the nanofiltration process in an amount of 191.5 tons with a content of dry substance of 0.45% is sent to reverse osmosis treatment for partial concentration and elimination of moisture. Membrane modules (KOCH) with a pore diameter of 0.0001 µm are used for the reverse osmosis treatment, which corresponds to a cutoff threshold relative to molecular weight of 400 daltons. A pressure of 40 bar is established. The whey under pressure, ensured by the action of pumps, is sent from the intermediate vessel by pipeline directly to the membrane module. During passage through the pores of the reverse osmosis membrane the NF permeate is separated into two fractions: only solvent molecules (water) pass through the pores in the membrane (permeate) but ions of inorganic compounds, lactose, protein, organic acids remain on the surface, which together with part of the water from the solution of RO retentate.

The RO permeate obtained after the reverse osmosis treatment in an amount of 162 t, containing 0.05% dry substance represents technical water and is subsequently used in other processes (rinsing and cleaning of surfaces of process equipment and rooms).

The RO retentate obtained during the process in an amount of 29.5 tons with 3.4% dry substance is sent to a diluate vessel of the electrodialysis unit (Mega) for partial elimination of lactose. The concentrate vessel of the electrodialysis unit is filled with an equivalent amount of distilled water. The electrodialysis process is run at a temperature of 12° C., current intensity 1.1 A, voltage 52 V; the flow rate of the diluate, concentrate and electrolyte are set at 700/h, 700 L/h, 500 L/h respectively. Sensors of electrical conductivity of the solutions are installed in the circulating contours for the diluate and concentrate. After passing through the electromembrane module of the electrodialysis unit the electrical conductivities of the diluate and concentrate emerging from its solutions change as a result of modification to their composition. The main contribution to total electrical conductivity is made by the mineral salts. When the electrical conductivity in the diluate loop drops to values less than 1 mS/cm, it is assumed that the demineralization level has reached about 80%. The process is stopped, when this demineralization level is reached based on the ratio of initial and final electrical conductivity values in the diluate solution.

The obtained ED diluate in an amount of 18 ton, which represents low-concentrated aqueous lactose solution, is then used in other processes.

The concentrate obtained after electrodialysis in an amount of 11.5 tons is sent to a multihousing vacuum evaporator Vigand-8000 for partial elimination of water and concentration of dry substance. The evaporation temperatures of the first and second stages are set at 75° C. and 52° C. respectively. The vacuum values during the process are set in the range 85±1 kPa.

During the process samples of the concentrated solution were taken to establish the degree of concentration. After about 4 hours the process is stopped when 40% dry substance is reached in the solution.

The concentrate of the complex dairy salt in an amount of 2.8 tons is then sent to a dryer of the spray type (for example, Al—OR2CH). The power of the metering pump is set at a value of 0.6 m$^3$/h, the vacuum in the drying chamber 50 Pa, air temperature at the input 177° C., air temperature at the output 90° C. The drying process is run for 7 hours to a moisture content of 3%.

As a result, a complex dairy salt is obtained in dry form in an amount of 1 ton whose composition includes: mineral salt 72%, protein 12%, organic acids 6%, lactose 7%, water—remainder.

Example 2

200 tons cottage cheese whey is used as raw material to produce a complex dairy salt in concentrated form. All the processing operations are carried out as in example 1, excluding the drying process.

It differs in that the process is completed after vacuum evaporation.

A concentrate of complex dairy salt is obtained in an amount of 2 tons with 40% dry substance. The dry substance includes: mineral salt 74%, protein 12.4%, organic acids 6.2%, lactose 7.4%.

Example 3

400 tons of a mixture obtained by mixing 300 tons cheese whey and 100 tons cottage cheese whey are used to produce a complex dairy salt. The preliminary treatment, pasteurization and nanofiltration operations of the whey are conducted similar to the operations described in example 1.

The NF retentate obtained after nanofiltration in an amount of 118 tons is collected in individual tanks and used partially for mixing with RO retentate after concentration and also in other processes (preparation of whey protein concentrates).

The obtained NF permeate with a content of 0.47% dry substance in an amount of 282 t, is sent to reverse osmosis unit (Alpma) for partial concentration and elimination of moisture. The reverse osmosis treatment is conducted similar to the process described in example 1.

The RO permeate obtained after reverse osmosis treatment in an amount of 264 tons with 0.05% dry substance represents technical water and is then used in other processes (for example, rinsing and cleaning of surfaces of the process equipment and rooms).

The obtained RO retentate in an amount of 18 tons is mixed in an intermediate vessel with 0.8 tons NF retentate obtained earlier in the nanofiltration process. The obtained mixture is sent to a multihousing vacuum evaporator Vigand-8000 for partial elimination of water and concentration of dry substance. The evaporation temperatures of the first and second stages are set at 75° C. and 52° C. respectively. The vacuum during the process is set in the range 80-90 kPa. During the process samples of the concentrated solution are taken to establish the degree of concentration. After about 6 hours the process is stopped when the dry substance reaches 40% in the solution.

The obtained dairy salt concentrate in an amount of 4.3 tons contains 40% dry substance. It is then sent to a dryer of the spray type (for example, Al-OR2Ch). The power of the metering pump is set at a value of 0.6 $m^3$, the vacuum in the drying chamber at 50 Pa, the air temperature at the input is 177° C., the air temperature at the output 90° C. The drying process is run to a moisture content of 3% within 10 hours.

A complex dairy salt is obtained in dry form in an amount of 1.5 tons including 37% mineral salt, 4% protein, 3% organic acids, 53% lactose, water—remainder.

Example 4

To produce a complex lactose salt in concentrated form 300 tons cheese whey is used as raw material. All the processing operations as in example 3 are conducted except for the drying process.

It differs in that the process is completed after the vacuum evaporation process.

A concentrate of complex lactose salt is obtained in an amount of 4.3 tons with 40% dry substance. The dry substance includes 38% mineral salts, 4.1% protein, 3% organic acids, 54.6% lactose.

Example 5

Dry complex lactose salt obtained according to the method mentioned in example 1. Composition: 72% mineral salts, 12% protein, 6% organic acids, 7% lactose, 3% water.

Example 6

Dry complex lactose salt obtained according to the method mentioned in example 3. Composition: 37% mineral salts, 4% protein, 3% organic acids, 53% lactose, remainder—water.

Example 7

For production of granulated cottage cheese using dried complex dairy salt obtained as described in example 1, cow's milk in an amount of 13.3 tons purified on a bactofuge is sent to the first section of a plate heat transfer unit (Tetra Therm Lacta), heated to 50±2° C. and then separated on a separator-cream separator into cream and defatted milk. Cottage cheese grain is obtained from the defatted milk in an amount of 8 tons according to the standard process (Tikhomirova, N. A., Technology and organization of milk and dairy product production, textbook, Moscow: DeLi print, 2007).

The cream obtained after separation in an amount of 4.64 tons is collected in an individual vessel and then used in other processes.

The cream obtained after separation in an amount of 0.66 tons is normalized to a fat content of 10%, complex lactose salt with 7% lactose (according to example 5) is introduced to it in an amount of 16 kg and sent to a sterilizing unit of the tubular type (Tetra Therm Aseptic Flex) for homogenization at a temperature of 60° C. at a pressure of 170 bar and sterilization at a temperature of 136±2° C. with holding for 4 seconds. Introduction of the salt promotes better retention of the cream (as a result of an increase in osmotic pressure of the medium) and improves the organoleptic properties of the end product.

The cottage cheese grain in an amount of 1 ton is mixed in a mixer with sterilized cream in an amount of 660 kg, into which complex dairy salt was previously introduced. An end product is obtained—granulated cottage cheese in an amount of 1 ton.

Example 8

For production of natural potato chips using dried complex dairy salt according to example 6 crude potato in an amount of 6 tons is used.

All processing operations for production of potato chips are conducted according to the standard processing scheme (Lichko, N. M., Technology for processing of plant products, Moscow, 200, 552 pages) to the salting step.

Salting of the fried potato is carried out in a coating machine (A2-TK2L). The dried complex dairy salt with a lactose content of 53% obtained according to example 6 is spread in an amount of 90 kg on the surface of the potato in the working chamber of the machine.

Use of dairy salt promotes a reduction in sodium content in the end product in comparison with a traditional production method and also improves the organoleptic properties of the product. Replacement of sodium with potassium also increases by a logical value of the product because of the overall reduction in consumption of sodium salts and enrichment of the diet of potassium salts necessary for normal functioning of the cardiovascular system.

An end food product salted with lactose salt is obtained—natural potato chips in an amount of 1 ton.

Example 9

For production of potato chips with a flavoring additive using dry dairy salt according to example 6 raw potato in an amount of 10 tons is used.

All the processing operations are conducted similar to example 8.

It differs from example 8 in that in the salting stage a flavoring additive (bacon) is applied to the dairy salt in an amount of 20.5 kg. Use of complex dairy salt with high content of lactose as a base for the flavoring composition promotes better distribution of the aromatic substances along the surface of the product. There is no need to introduce additional carriers to the potato for aromatic substances, like lactose, glucose or milk protein, which promotes significant economy.

An end product is obtained—potato chips with bacon flavor in an amount of 1.6 tons.

Example 10

For production of "table" crackers using complex dairy salt according to example 6 a steamless dough production scheme on a continuous line is used, for example, QN-280.

High-grade wheat flour in an amount of 956.5 kg is fed to a dough mixer. At the same time activation of yeasts is carried out: pressed yeasts in an amount of 32.76 kg are placed in a vessel, ground, mixed with a certain amount of water, prescribed for the batch (60 kg) at a temperature of 32° C. and held for 30 minutes. The activated yeasts are fed to the dough mixing machine.

Preparation of an emulsion is carried out in a separate vessel. Molasses in an amount of 21.44 kg, margarine previously heated at 45° C. in an amount of 139.3 kg, complex dairy salt with 53% lactose (according to example 6) in an amount of 8 kg, water in an amount of 70 kg are introduced to the vessel. The mixture is held at a temperature of 30° C. and fed to an emulsifier, where it is mixed for 1 minute and then fed to the dough mixer.

The dough batch is produced in the dough mixer at a temperature of 35° C. The finished dough is rolled out on a molding machine for rolling and cutting, after which the dough is sent for formation of blanks to a forming machine where rolling of the forms occurs in order to avoid formation of large bubbles and swelling of the dough.

The crackers are baked in a hot air cabinet of the tunnel type at a temperature of 270±2° C. for 3 minutes. After baking the crackers are immediately sprayed with molten fat (margarine) according to the formula. The end products are cooled on a conveyor to 40° C. and packed in the consumer package.

An end product is obtained—table crackers in an amount of 1 ton.

The end product has reduced sodium content in comparison with crackers prepared with table salt. Its organoleptic properties are improved by introducing milk components (protein, lactose).

Example 11

The complex dairy salt obtained according to the method mentioned in example 4 is used to produce "table" crackers.

All operations are conducted similar to that described in example 10.

It differs from example 10 in that instead of dried complex dairy salt, concentrate of complex dairy salt containing 40% dry substance (according to example 4) is introduced to the mixing vessel in an amount of 19.2 kg. Use of concentrate facilitates dissolution and mixing of the components with a small amount of formula water.

An end product is obtained—table crackers in an amount of 1 ton.

Another aspect of this disclosure relates to a method of making another dairy salt or potassium-based composition, which contains a masking fraction that is able to conceal or minimize the off-flavor contributed by potassium. As used herein, the term or phrase "potassium-based composition" is used interchangeably with the terms or phrases "potassium-rich composition" and "potassium composition." These terms refer to an alternative dairy salt composition, which can be used to salt products and thereby create food products (whether in liquid, solid, or semi-liquid form) with a reduced sodium content and without the off-taste of potassium, as compared to an equivalent food product not salted or combined with the potassium composition described below. Thus, the off-flavor of potassium is masked by the presence of certain compounds, which make up what is termed here as the "masking fraction."

The method comprises the steps of i) combining potassium and sodium at a ratio of greater than about 2.0 to form a mineral component; ii) combining the mineral component with the masking fraction to make a potassium-based composition, the masking fraction concealing an off-flavor of the potassium, said masking fraction comprising: a) an organic acid portion substantially consisting of lactic acid; b) an amino acid portion consisting of one or more amino acids selected from the group consisting of: glycine, valine, and glutamic acid; c) a fatty acid portion substantially consisting of one or more fatty acids selected from the group consisting of: myristic acid, palmitic acid, stearic acid, oleic acid, and linoleic acid; and d) a sugar portion consisting of one or more sugars; in a weight ratio of the organic acid portion:the amino acid portion:the fatty acid portion:the sugar portion of about 6-9:0.1-0.4:0.25-1.25:0.5-2.5, wherein said weight ratio is as a percentage of the potassium-based composition.

In one embodiment, the sodium and potassium combined in combining step i) come from sodium chloride and potassium chloride, respectively. However, one skilled in the art, armed with this disclosure, will recognized sodium and potassium may come from any number of safe-to-ingest forms. In one embodiment, the potassium and sodium may be combined at a ratio of greater than about 2.5 to form the mineral component. In one embodiment, the potassium and sodium may be combined at a ratio of between about 2.0 to about 11. In one embodiment, chloride may also form part of the mineral component. In one embodiment, the mineral component comprises one or more of: calcium, magnesium, phosphorus, and sulfate. Such additional components may be present in an amount up to about 15% of the potassium-based composition in one embodiment. In another embodiment, the mineral component comprise one or more of the additional components calcium, magnesium, phosphorus, and sulfate in an amount up to about 6%. In one embodiment, the combining step ii) comprises about 85% to about 95% of the mineral component in the potassium-based composition, on a dry weight basis. In one embodiment, the combining step ii) comprises about 90% of the mineral component in the potassium-based composition, on a dry weight basis. Table 4, below, depicts a sample composition of a mineral component described herein (dry weight basis).

TABLE 4

Sample composition of a mineral component of the potassium based composition

| Mineral Component | Amount (dry weight basis) |
| --- | --- |
| Potassium | ~31 g/100 g of total composition |
| Sodium | ~12 g/100 g of total composition |
| Chloride | ~41 g/100 g of total composition |
| One or more of: calcium, magnesium, phosphorous, and sulfate | ~6 g/100 g of total composition |

As used herein, the organic acid portion "substantially consisting" of lactic acid means that the organic acid portion comprises lactic acid in an amount of at least about 60%. In one embodiment, the organic acid portion comprises a maximum amount of about 95%. In one embodiment, the organic acid portion comprises lactic acid in an amount of between about 60% to about 95%. In one embodiment, the organic acid portion consists of lactic acid. In one embodiment, other organic acids selected from the group consisting of citric acid, acetic acid, formic acid, fumaric acid, and oxalic acid may also be present within affecting the taste. Thus, in one embodiment, the organic acid portion may also comprise one or more of citric acid, acetic acid, formic acid, fumaric acid, and oxalic acid. The below Table 5 depicts a sample organic acid portion of the potassium based composition described herein. In one embodiment, the potassium-based composition comprises between about 6% to about 9% of the organic acid portion. In one embodiment, the potassium-based composition comprises about 7.5% of the organic acid portion.

TABLE 5

Sample organic acid portion of the potassium based composition

| Organic Acid Component | Amount |
|---|---|
| Lactic Acid | ~5.0 g/100 g |
| One or more of: citric, acetic, formic fumaric, and oxalic acids | ~2.5 g/100 g |

The potassium-based composition should comprise a masking fraction with an amino acid portion consisting of one or more amino acids selected from the group consisting of: glycine, valine, and glutamic acid. In one embodiment, the amino acid portion consists of two or more the amino acids selected from the group consisting of: glycine, valine, and glutamic acid. In one embodiment, the amino acid portion consists of all three of the amino acids selected from the group consisting of: glycine, valine, and glutamic acid. The potassium-based composition should comprise a masking fraction with between about 0.1% to about 0.4% of the amino acid portion. In one embodiment, the potassium-based composition comprises about 0.25% of the amino acid portion. The amino acid portion helps modify the salty taste perception of a consumer and synergistically drive salty taste. Table 6, below, a sample amino acid portion of the potassium based composition described herein.

TABLE 6

Sample amino acid portion of the potassium based composition

| Amino acid Component | Amount (dry weight basis) |
|---|---|
| Glycine | ~0.1125 g/100 g |
| Valine | ~0.075 g/100 g |
| Glutamic Acid | ~0.0625 g/100 g |

As used herein, the fatty acid portion "substantially consisting" of one or more fatty acids selected from the group consisting of: myristic acid, palmitic acid, stearic acid, oleic acid, and linoleic acid means that the fatty acid portion comprises at least one of the listed fatty acids in an amount of at least about 80%. In one embodiment, the fatty acid portion substantially comprises two or more fatty acids selected from the group consisting of: myristic acid, palmitic acid, stearic acid, oleic acid, and linoleic acid, where substantially consisting of means an amount of at least 80%. In one embodiment, the fatty acid portion substantially comprises three or more fatty acids selected from the group consisting of: myristic acid, palmitic acid, stearic acid, oleic acid, and linoleic acid, where substantially consisting of means an amount of at least 80%. In one embodiment, the fatty acid portion substantially comprises four or more fatty acids selected from the group consisting of: myristic acid, palmitic acid, stearic acid, oleic acid, and linoleic acid, where substantially consisting of means an amount of at least 80%. In one embodiment, the fatty acid portion substantially comprises all five of the fatty acids selected from the group consisting of: myristic acid, palmitic acid, stearic acid, oleic acid, and linoleic acid, where substantially consisting of means an amount of at least 80% of all five acids in the fatty acid portion. In some embodiments, in addition to the above listed fatty acids making up a majority of the fatty acid portion, the fatty acid portion may comprise one or more of heptadecanoic acid, arachidic acid, behenic acid, arachidonic acid, and euric acid. These additional fatty acids may be present in a maximum amount of about 15% of the fatty acid portion. In one embodiment, the potassium-based composition comprises a masking fraction with between about 0.25% to about 1.25% fatty acid portion. In one embodiment, the potassium-based composition comprises a masking fraction of about 0.75% fatty acid portion. Table 7, below, depicts a sample portion of the fatty acid portion described herein.

TABLE 7

Sample portion of the fatty acid portion of the potassium-based composition

| Fatty Acid Component | Amount (dry weight basis) |
|---|---|
| Myristic acid | 0.3 g/100 g |
| Palmitic acid | 0.15 g/100 g |
| Stearic acid | 0.15 g/100 g |
| Oleic acid | 0.075 g/100 g |
| Linoleic acid | 0.075 g/100 g |
| Minimal amounts of one or more of: heptadeconic acid, arachidic acid, behenic acid, arachidonic acid, and euric acid | 0.1 g/100 g |

The masking fraction of the potassium-based composition should comprise a sugar portion, having only sugars. The potassium-based composition comprises between about 0.5% to about 2.5% of the sugar portion relative to the entire potassium-based composition. In one embodiment, the potassium-based composition comprises about 1.5% of the sugar portion. In one embodiment, the sugar portion substantially consists of (or comprises primarily) two sugars-isomaltulose and galactose. As used herein, substantially consisting of isomaltulose and galactose means at least about 95% isomaltulose and galactose in the sugar portion. Table 8, below, depicts a sample sugar portion of the potassium-based composition.

TABLE 8

Sample portion of the sugar portion of the potassium-based composition

| Sugar Component | Amount (dry weight basis) |
|---|---|
| Isomaltulose | 0.5 g/100 g |
| Galactose | 1.0 g/100 g |

Tables 4-8 each show sample portions of the mineral component and masking fraction. Thus, in one embodiment, a potassium-based composition as described herein may comprise or consist of the components in Tables 4-8. However, in other embodiment, the components of the masking fraction, and the disclosed ranges or additions of same, may be present in any number of combinations, within the ranges provided herein, while still successfully masking the off-taste provided by potassium. A sample masking fraction as a percentage of the mineral component is as follows.

TABLE 9

One embodiment of a masking fraction of the potassium-based composition.

| Masking Fraction Component | Amount (%) |
|---|---|
| Organic acid portion | 8.33 |
| Amino acid portion | 0.28 |
| Free fatty acid portion | 0.83 |
| Sugar portion | 1.67 |

In another aspect of the present disclosure, a snack food product is made using the method and potassium-based composition described herein. Generally, the method for making a snack food product comprises the steps of: i) combining potassium and sodium at a ratio of greater than about 2.0 to form a mineral component; ii) combining the mineral component with a masking fraction to mask an off-flavor of the potassium and form a potassium-rich composition with said masking fraction, wherein the masking fraction comprises: a) an organic acid portion substantially consisting of lactic acid; b) an amino acid portion consisting of one or more amino acids selected from the group consisting of: glycine, valine, and glutamic acid; c) a fatty acid portion substantially consisting of one or more fatty acids selected from the group consisting of: myristic acid, palmitic acid, stearic acid, oleic acid, and linoleic acid; and d) a sugar portion consisting of one or more sugar; in a weight ratio of the organic acid portion:the amino acid portion:the fatty acid portion:the sugar portion of about 6-9:0.1-0.4:0.25-1.25:0.5-2.5, wherein said weight ratio is as a percentage of the potassium-rich composition; and iii) combining the potassium-rich composition with said masking fraction with an edible substance for consumption. The edible substance may be, for example, a cooked snack food product, the dry ingredients or dry mix of an uncooked product, or a liquid, or semi-liquid edible product.

Put differently, the dairy salt or potassium-based composition, once prepared, may be combined with an edible substance or substances for ultimate consumption, to create a food or liquid product having reduced sodium, as compared to one without the dairy salt described herein. Thus, the above definitions and amounts of each portion of the masking fraction apply for the method of making a snack food product. In one embodiment, the combining step may be adding the potassium composition onto the surface of an already salted potato chip. Such addition has resulted, for example, to achieve up to about a 40% reduction in sodium during sample preparation and test runs (vs. product seasoned with sodium chloride alone). In one embodiment, the combining step comprises mixing the potassium-rich composition with its masking fraction into an oil slurry for topical application onto said snack food product. Such mixing has resulted, for example, to achieve a sodium reduction of about 20-25%, as compared to an equivalent food product salted with sodium chloride alone and without the potassium composition described herein. In one embodiment, the method comprises the step of combining the potassium-rich composition having the masking fraction with one or more seasonings prior to the step of topically adding the potassium-rich composition onto the surface of a snack food product. Such combining step has resulted, for example, in a sodium reduction of about 30%, as compared to an equivalent food product not incorporating the potassium composition or dairy salt described herein.

In general, the potassium composition or dairy salt described herein, may be combined with any edible substance in any form ranging from liquid to solid, regardless of moisture content, thereby reducing sodium content of the edible substance for ultimate consumption. In one embodiment, the edible substance is savory. In one embodiment, the edible substance(s) may comprise a moisture content of less than about 5%. The edible substance, for example, may be a cooked or shelf-stable snack food product such as a chip, extruded snack food, or puffy snack food. In one embodiment, the edible substance may be a high-moisture snack food product, comprising a moisture content of at least about 25%. In one embodiment, the edible substance may be a high-moisture snack food product, comprising a moisture content of at least about 50%. For example, such high-moisture snack food product may be selected from the group consisting of oatmeal, cheese dips, salsa, and beverage. In one embodiment, the edible substance is in powder form and may be mixed with the potassium-rich composition in dry form.

The above disclosed composition provides for a solution to addresses the off-taste of potassium perceived by consumers, while reducing sodium in a food product, offering between about 5% to about 40% sodium reduction in food vs. a product seasoning with a sodium salt (such as sodium chloride) alone. In some embodiments, the potassium composition disclosed herein provides for between about 22% to about 30% reduction in sodium without the perception of any off-flavor. In some embodiments, the potassium composition disclosed herein provides for between about 15% to about 25% reduction in sodium.

Sensory evaluation has validated the elimination of off-flavors typically associated with potassium salts. Dairy mineral samples had significantly higher dairy notes. Thus, the resulting potassium composition described herein further provides the benefit of an enhanced flavor profile of a resulting snack food, enhancing dairy notes. Thus, the composition described herein is useful when combined with dairy products such as cheese seasonings. The potassium-rich composition may be added to any number of ingestible substances, whether in solid, semi-solid, or liquid form, thereby reducing sodium of the product to be consumed. Suitable ingestible substances include any savory product including without limitation shelf-stable, ready-to-eat snack foods such as chips or crackers, cheese dips, salsa, oat-based product including oatmeal or oatmeal-like products, beverages, lassi, tomato juice, broths, soups, pre-pared boxed mixes such as Rice-A-Roni® and Pasta-A-Roni®, and poha. In one embodiment, the potassium-rich composition described herein is added into an ingestible substance during preparation and prior to final cooking steps. Those skilled in the art, when armed with this disclosure, will recognize a number of additional benefits and advantages of using the dairy salts described herein together with any number of foods and beverages, whether sweet or savory. It will be understood by one of ordinary skill in the art that numerous variations will be possible to the disclosed embodiments without going outside the scope of the invention as disclosed in the claims.

The invention claimed is:

1. A method for production of a complex dairy salt comprising the following sequential steps:
providing a milk raw material that includes raw milk or whey,
pasteurizing the milk raw material;
concentrating the pasteurized milk raw material by nanofiltration through a filter with a pore size of 0.001-0.01 µm to obtain a nanofiltration permeate;
filtering the nanofiltration permeate through a membrane module with a pore size of 0.0001-0.001 µm of a reverse osmosis unit to obtain a reverse osmosis retentate,
subjecting the reverse osmosis retentate to electrodialysis to provide an effluent containing a reduced-lactose content;
concentrating the electrodialysis effluent to provide a concentrate of complex dairy salt;

drying the concentrate to provide a complex dairy salt comprising 70-80% mineral salts, 10-20% protein, 6-9% organic acids, 0.5-7.4% lactose, and the remainder water.

2. A method for production of a complex dairy salt comprising the following sequential steps:

providing a milk raw material that includes raw milk or whey;

pasteurizing the milk raw material;

concentrating the pasteurized milk raw material by nanofiltration through a filter with a pore size of 0.001-0.01 μm to obtain a nanofiltration permeate and a nanofiltration retentate;

filtering the nanofiltration permeate through a membrane module with a pore size of 0.0001-0.001 μm of a reverse osmosis unit to obtain a reverse osmosis retentate, mixing the reverse osmosis retentate with the nanofiltration retentate;

concentrating the reverse osmosis retentate to provide a concentrate of complex dairy salt;

drying the concentrate to provide a complex dairy salt comprising 18-40% mineral salts, 4-6% protein, 2-3% organic acids, 53-70% lactose, and the remainder water.

* * * * *